United States Patent [19]

McEvilly, Jr.

[11] 4,232,390
[45] Nov. 4, 1980

[54] MOBILE RADIO VEHICLE CONTROL SYSTEM

[76] Inventor: Richard V. McEvilly, Jr., 236 Tulane Rd., Costa Mesa, Calif. 92626

[21] Appl. No.: 829,797

[22] Filed: Sep. 1, 1977

[51] Int. Cl.³ .............................................. H04B 1/40
[52] U.S. Cl. ...................................... 455/77; 455/78; 455/89
[58] Field of Search ....................... 325/53, 15, 16, 22, 325/21, 111, 115, 117, 114, 25, 51, 56, 54, 55; 334/7, 47, 86; 455/77, 78, 87, 89, 95, 99

[56] References Cited

U.S. PATENT DOCUMENTS

| | | | |
|---|---|---|---|
| 3,059,184 | 10/1962 | Germain | 325/21 |
| 3,271,679 | 9/1966 | Fostoff | 325/15 |
| 3,909,720 | 9/1975 | Fantera | 325/67 |
| 4,009,375 | 2/1977 | White et al. | 325/117 |

*Primary Examiner*—Robert L. Richardson
*Assistant Examiner*—Tommy P. Chin
*Attorney, Agent, or Firm*—Huebner & Worrel

[57] ABSTRACT

A driver-operated electronic push-button control system is provided for installation and use within a mobile radio vehicle, which control system is capable of operating and controlling a plurality of radio transmitter/-receiver communication units, and of operating and controlling additional electronic and electrical equipment commonly required in emergency type vehicles. Electronic circuitry is provided, in the form of a combiner unit, to interface the radio transmitter/receiver communication units and the other electronic and electrical equipment, with the control system. Both the combiner unit and radio transmitter/receiver units may conveniently be located in the trunk of the vehicle. For emergency type vehicles, special additional electronic circuitry is included within the combiner unit that provides an electronic siren, a public address system, an outside speaker system, and electronic switching for the control of electronic lights in the roof-mounted light bar. The electronic control system of the invention includes a console. The console may be located within the dash area of the vehicle for operation by the driver-operator. Two keyboards, each consisting of a plurality of push-button illuminated switches, are included in the console for the selection of transmit and receive frequencies of the radio transmitter/receiver units. An additional keyboard may be included in the console for operation and control of the emergency type equipment referred to above when the system is installed in an emergency type vehicle.

8 Claims, 11 Drawing Figures

* O/S = OUTSIDE SPEAKER

MOBILE RADIO VEHICLE CONTROL SYSTEM

BACKGROUND OF THE INVENTION

1. Field of the Invention

The invention relates to the mobile radio field, and more specifically concerns a control system for controlling a plurality of mobile radio communication transmitter/receiver units and other types of electronic and electrical equipment, used in a mobile radio vehicle. The control system of the invention serves to resolve problems that have plagued the mobile radio field with respect to multiple system type installations in mobile radio vehicles.

2. Discussion of the Prior Art

The basic type of systems which are representative of the prior art used for control of a plurality of radio transmitter/receiver units, and other equipment, in a mobile radio vehicle comprises a multiplicity of control units mounted within the dash area of the vehicle, and numerous connecting cables extending between the dash area and the equipment in the trunk of the vehicle. Each of several complete prior art systems are purchased, installed, operated, and maintained on an individual basis. The cluster of control units, microphones, speakers, and sub-system units located in the dash area is commonly known to the prior art as the mobile control center.

In emergency type vehicles, such as those used by public safety organizations, an additional control unit must be installed within the dash area to operate the electronic siren, public address system, radio receiver outside speaker system, roof-mounted light bar, and other equipment normally installed in this type of vehicle.

In recent years, yet additional types of equipment and systems have been added to the mobile control center, in order to keep the modern mobile radio vehicle compatible with modern and complex communication control centers that have acquired new sophisticated type of hardware, techniques, and modes of operation. During the past decade, digital status systems, teleprinter systems, facsimilie systems, vehicle locater systems, scanning systems, and scrambler systems are examples of new type of systems which have been made available to the mobile radio field and which require installation and operation within the dash area of the vehicle. Essentially, a situation which originally started to become complex during the sixties, has steadily developed and grown during the seventies, and is very likely to become a crisis during the eighties.

Thus, the efficiency of operation and the appearance of the present-day mobile control center is poor to mediocre. The mobile control center takes up too much room within the dash area of the vehicle, and it presents a safety hazard to the occupants of the vehicle. Eventual removal of the prior art systems for transfer to new vehicles is costly and time comsuming. The entire prior art systems and equipment used in mobile radio vehicles are physically and technically entangling and a financial burden upon the user. Also, due to the energy crisis, which is causing new car manufacturers to produce smaller vehicles, less space within the dash area is available for the mobile control center.

Although many variations and combinations of the vertical rack mounts and the floor-mounting of control units can be found throughout the mobile radio field, the user of such type of equipment cannot deviate very much from the basic configueration of systems presently available, or integrate several systems obtained from different manufacturers. This is due primarily to the lack of standardization within the industry of hardware such as control units, microphones and microphone jacks, sub-systems, cables and connectors. The wiring and electronic circuitry used for microphone circuits, the manner of selecting frequencies, the receiver output circuits, etc., differ significantly between manufacturers of communication equipment. Also, emergency type equipment must necessarily be controlled separately from the radio communication systems.

The control system provided by the present invention eliminates the necessity to separately purchase, install and maintain a multiplicity of control units within the dash area, and the need to install an equal number of control cables between the dash area and the trunk of a vehicle, as is required by the prior art to operate and control the plurality of radio transmitter/receiver units and other types of electronic and electrical systems used in emergency type mobile radio vehicles. This relieves the user of multiple system mobile radio vehicle of the physical, technical, operational, and financial problems associated with the necessity to self-assemble, and to later remove, the mobile control centers. It also reduces the many negative factors which result from the self-assembled mobile control centers concerning, for example, the efficiency of operation, poor appearance, and the like.

The system of the invention results in a reduction of time and labor for the installation, long range overhead costs of time and labor required to service the controlling portion of such systems, and eventual reduction of cost to remove the systems. As opposed to prior art types of mobile control centers, both the console and the combiner portions of the control system of the present invention can be readily removed for repair or exchange. This reduces out of service time of vehicles which require servicing of the equipment. Also, the use of plug-in modules and plug-in circuits boards in the system of the invention helps the service technician isolate the possible cause of faulty operation, and thus expedites the repair of the system.

The control system of the invention substantially improves the appearance of the controlling equipment located within the dash area, reduces the amount of space required for the equipment, and also reduces the hazard of the equipment located within the dash area. The control system of the invention is efficient in operation, in that it provides a single push-button control panel and a single microphone to the driver-operator for the control of a plurality of communication systems and other equipment installed within the vehicle. This grouping of controls reduces confusion to the operator, thereby increasing the efficiency of operation. The console may be adjusted to any desired height and angle to optimize visibility of the controls for the driver-operator, to minimize distraction and optimize his concentration on driving the vehicle.

The use of momentary push-button switches and integrated circuitry in the system of the invention, as opposed to mechanical multi-contact switches commonly used by the prior art to select frequency and other functions, reduces the problems experienced with oxidation, corrosion, dust and dirt, and wear of contacts. The use of the push-button switches and integrated circuit components and circuitry contributes to the reduction of size and weight of the console in the system of the invention. Electronic switching is more reliable, and the encoding-decoding type of electronic controls used in the system of the invention reduces the number of wires required in the cable connecting the console and combiner.

The system of the invention effectively nullifies any impasse which may exist within the field of mobile radio communication regarding the type of hardware and the configuration of systems available for use within the mobile radio vehicle versus the type which may be desired and needed by the user of the multiple system mobile radio vehicle. The system of the invention serves to alleviate many problems related to the installation and control of a plurality of radio and electronic and electrical systems within the vehicle. The system of the invention can assist the user to be more self-sufficient in resolving problems related to the mobile radio vehicles, rather than depending upon and waiting for others to offer solutions to the problems, as has been the case for the past three decades.

SUMMARY OF THE INVENTION

The invention provides a control system for installation in mobile radio vehicles. The control system of the invention retains the use of the trunk-mounted radio transmitter/receiver units, but supplants numerous control units in the mobile control center with one console, and substantially reduces the number of connecting cables required between the mobile control center in the dash area of the vehicle and the equipment mounted in the trunk thereof.

In the practice of the invention, only the basic system, consisting of the console located, for example, within the dash area of the vehicle, the combiner unit located for example, within the trunk of the vehicle, and a cable interconnecting the two units, is required to be installed in the vehicle, serviced, operated, and later removed from the vehicle. Installation, servicing, and removal of all equipment interfaced to the combiner unit of the system of the invention are confined to the trunk of the vehicle. In accordance with the invention, the control cable supplied by the manufacturer for each radio transmitter/receiver unit and intended for connection to a separate control unit in the dash area of the vehicle is, instead, interfaced to the combiner unit by the use of a plug-in module which integrates all the radio functions into a common console.

Computer type logic switching circuitry and photocell components located in the combiner unit are used in the system of the invention to overcome lack of standardization within the industry concerning the variety of designs used by the manufacturers of mobile radio communication equipment. Specially designed plug-in modules which plug into the main combiner unit standardize the circuitry of transmitter functions of each transmitter/receiver and permit control of all transmitters with one microphone. The same encoding-decoding system used to select transmit frequencies in the individual transmitters, also automatically selects the correct plug-in module for the selection of the correct transmitter for any particular transmission. Isolation transformers standardize the receiver audio output of all the radio transmitter/receiver units by establishing chassis ground as the audio low reference level with the secondary winding of each transformer.

Transmit and receive frequency push-button keyboards located on the console control panel activate integrated circuit components and circuitry which encode information relating to the selections made by the driver-operator pertaining to any one of a plurality of possible transmit frequencies, one receiver frequency of each transmitter/receiver; and emergency equipment functions such as a siren, public addres, and radio receiver outside speaker system, light bar electrical light units and the like, when the system is installed in an emergency vehicle. The control signals are transmitted in the system of the invention to decoder circuitry located within the combiner unit by way of the interconnecting cable.

Separate volume controls are located on the console panel to control the level of audio to a speaker from each of the transmitter/receiver units integrated into the system of the invention. A unique electronic muting function is provided by the system which can be activated by the pressing of two push-buttons of the transmit frequency select keyboard at the same time. This action serves to mute the receiver circuits of all transmitter/receiver units other than the one selected by the keyboard. Reselecting the channels with the receive frequency select keyboard serves to return the system to normal operation.

A section of the console panel may be dedicated to the control of direct current circuitry by the use of rocker switches to switch battery power on and off to the several pieces of equipment. Two of the rocker switches may be used to operate two alley lights which are mounted on each end of the roof-mounted light bar, when the system is installed in an emergency vehicle. The latter switches connect a ground to appropriate transistor switching circuitry located within the combiner unit. The transistor circuitry switches battery voltage to the alley lights by way of a cable connected to the light bar from the combiner. Another rocker switch may be used to energize a relay, the contacts of which disconnect a prearranged number of vehicle lights when the relay is energized. This switch is used by emergency type vehicles, such as public safety patrol cars. Another switch may be connected to the ignition switch of the vehicle, and may be used to energize a relay with battery voltage when the vehicle ignition is turned on. The relay is located in the combiner and serves to supply power for distribution within the combiner.

Optional equipment, circuitry, and functions are available for use within the console and combiner in the system of the invention. A light emitting diode read-out of the transmit channel selected by the transmit frequency select keyboard, a meter to indicate microphone audio level, a voltmeter to indicate battery voltage, a jack to supply battery power to accessory equipment, a microphone keying foot switch, and sub-systems which may be included within the combiner or later added to the system, are examples of optional equipment and functions which are available in the control system of the invention.

DETAILED DESCRIPTION OF THE ILLUSTRATED EMBODIMENT

Figure 1:
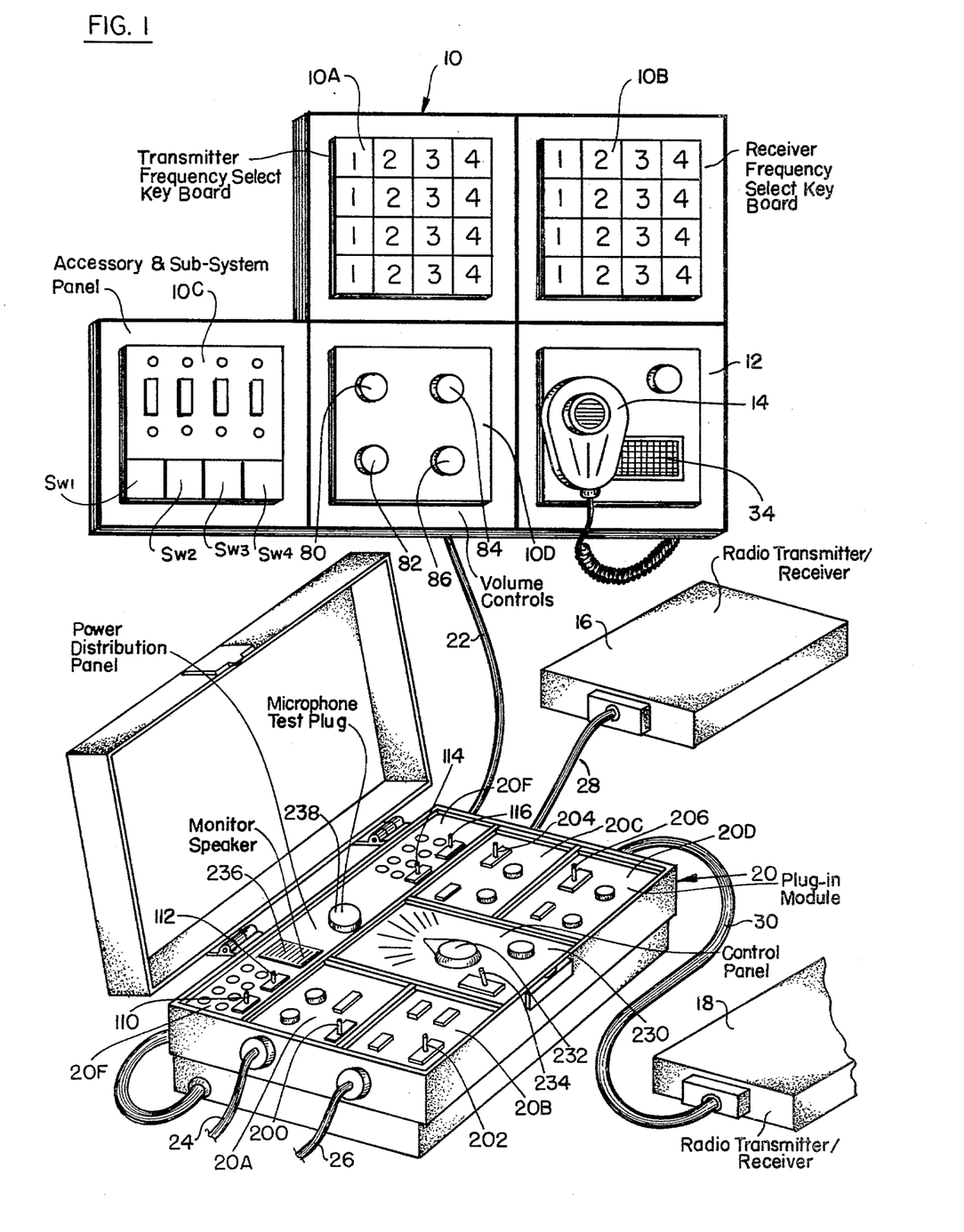
FIG. 1 is a perspective representation of the system of the invention in one of its embodiments, which does not include the emergency vehicle controls, and shows a console which may be located in the dash area of a vehicle; the console being electrically connected to a combiner and to a plurality of radio transmitter/- receiver radio communication units which may be located in the trunk area of the vehicle.

The console portion of the control system of the invention is designated 10 in FIG. 1, and is preferably installed in the dash area of the vehicle at a convenient height and angle for viewing and operation by the driver-operator. The console of FIG. 1 does not include emergency vehicle controls which will be discussed subsequently herein. The face of the console is divided into four sections. A first section contains a number of illuminated push-button switches which serve as a keyboard 10A to select different transmitter/receiver frequencies; a second section contains a number of illuminated push-button switches which serve as a keyboard 10B to select different receiver frequencies; a third section 10C contains a number of rocker on-off switches to provide power to emergency lights, activate vehicle lights, provide ignition power to the console and combiner units, and to provide other controls for necessary equipment; and a further section 10D contains appropriate volume controls for the radio and transmitter/receiver units.

A microphone hangup bracket 12 is provided on console 10, and this bracket supports a microphone 14. A speaker 34 is mounted on the console, as shown, or in any other desired position within the dash area.

Figure 2:
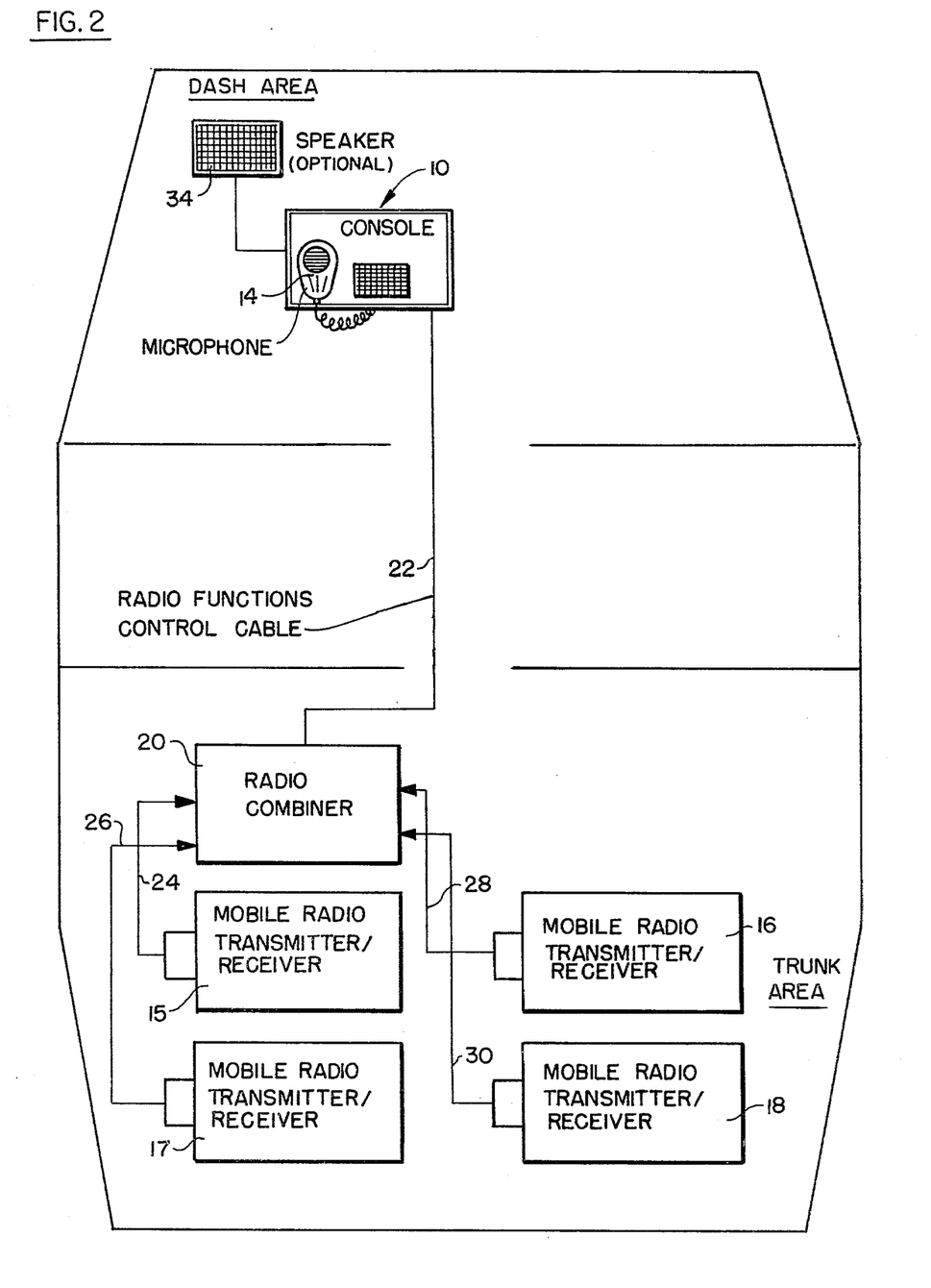
FIG. 2 is a generalized block diagram of the system of FIG. 1.

As shown in FIGS. 1 and 2, a plurality of separate mobile radio transmitter/receiver units 15, 16, 17 and 18, and a radio combiner 20, are mounted in the trunk area of the vehicle. The push button switches electronic circuitry of keyboards 10A and 10B, the microphone 14, and the volume controls 80, 82, 84, 86 are all connected to combiner 20 by a cable 22. The combiner is connected to the various radio transmitter/receiver units by separate cables such as cables 24, 26, 28 and 30. All the radio transmitter/receiver units are operated by the keyboards of console 10, by the volume controls 80, 82, 84, 86 and by the microphone 14. Selections are made automatically between the various radio transmitter/receiver units, as desired transmitter frequency selections are made, by operation of the push button switches of keyboard 10A of the console.

The combiner 20 includes four plug in modules 20A, 20B, 20C and 20D (FIG. 1) for the four radio transmitter/receivers 15, 16, 17 and 18. The combiner also includes a power distribution panel 20F containing switches and fuses for each radio transmitter/receiver unit, as well as a monitor speaker and select switch for monitoring the receivers in each of the radio transmitter/receiver units, and a microphone test plug for testing each transmitter.

Combiner 20 in FIG. 1 also includes a control panel 230 which has a select switch 232 and an on-off switch 234. For monitoring purposes, the switch 235 may be turned on, and switch 232 set to a particular module 20A, 20B, 20C and 20D. Then, the corresponding radio unit may be monitored through monitor speaker 236, and its transmission may be tested by a microphone plugged into test plug 238.

As described above, the console 10 is constructed to operate and control all the transmit and receive functions of the four radio-transmitter/receiver units 15, 16, 17 and 18 in the embodiment under consideration. Each radio transmitter/receiver unit may be a four-frequency type, for example, so as to provide a total of sixteen frequency channels. The sixteen illuminated push button switches forming the keyboard 10A of the control panel 10 are shown schematically in FIG. 3. In the illustrated embodiment, the top row of push button switches of keyboard 10A controls radio transmitter/receiver 15 to select each of its four frequency channels ($F_1$, $F_2$, $F_3$, $F_4$); the second row of push button switches serves to control radio transmitter/receiver unit 17 to select each of its four frequency channels ($F_1$, $F_2$, $F_3$, $F_4$) which are different from the frequencies of radio transmitter/receiver unit 15; the third row of push button switches controls radio transmitter/receiver unit 16 to select each of its four frequency channels; and the fourth row controls the radio transmitter/receiver 18 to select each of its four frequency channels. The push button switches of keyboard 10A are interlocked, so that the circuitry associated with one switch only can be activated, and only one switch can be illuminated, at any one time.

Figure 3:
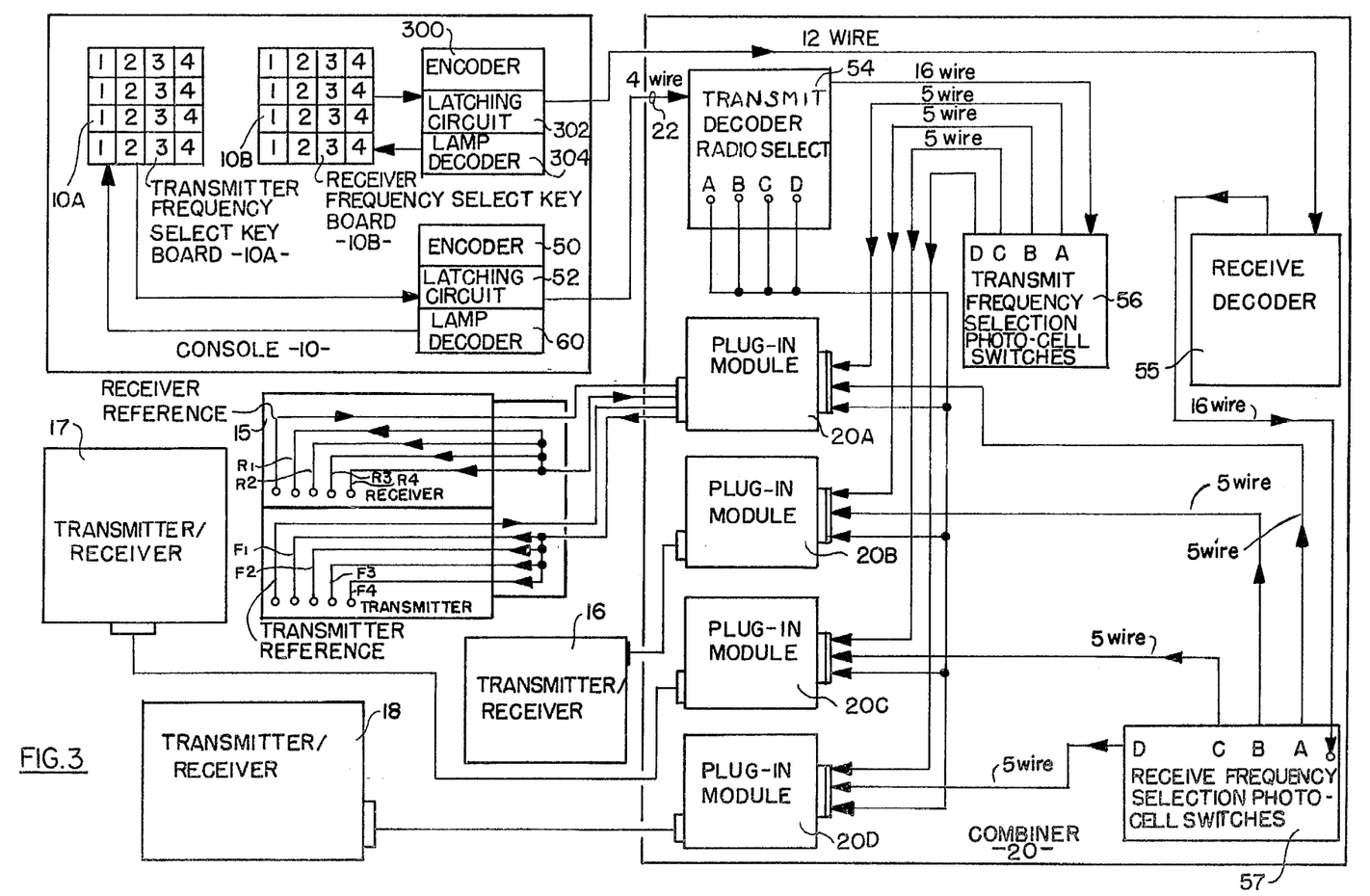
FIG. 3 is a block diagram of the system of FIG. 1 in somewhat more detail.

The sixteen illuminated push button switches forming the keyboard 10B of the control panel 10 are also shown schematically in FIG. 3. In the illustrated embodiment, the top row of switches controls the receiver of radio unit 15 to select each of its four receiver frequencies ($F_1$, $F_2$, $F_3$, $F_4$); the second row of switches serves to control the receiver of radio unit 17 to select each of its four frequencies ($F_1$, $F_2$, $F_3$, $F_4$) which are different from the receiver frequencies of radio unit 15; the third row of switches controls the receiver of radio unit 16 to select each of its four receiver frequencies, which again are different from the previous frequencies; and the fourth row controls the receiver of radio unit 18 to select each of its four receiver frequencies. Each row of push button switches of the keyboard 10B are also interlocked so that the circuitry associated with one switch in each row can be activated, and only one switch can be illuminated, at any one time.

As shown in FIG. 3, and as will be described in more detail in FIG. 4, the push button switches of the keyboard 10A are connected to an encoder 50 which, in turn, is connected to a latching circuit 52. The output of latching circuit 52 is connected to a lamp decoder 60 which is connected back to the lamps illuminating the push button switches of the keyboard.

When any particular push button switch of the keyboard 10A is actuated, the encoder 50 responds to the actuated switch to generate a corresponding binary-coded decimal (BCD) signal which is latched in the latching circuit 52. The decoder 60 responds to the latched BCD signal to generate a corresponding decimal signal which energizes a lamp in the actuated push button switch, so that the actuated switch is illuminated. The latched output of the latching circuit 52 is also connected over four-wire cable 22 to decoder 54 in the combiner 20. The decoder 54 responds to the latched BCD signals on the cable to generate the corresponding decimal signals. For each group of four binary-coded decimal signals, the decoder 54 generates a decimal signal at the designated outputs A, B, C and D, so that a corresponding one of the radio units 15, 16, 17 and 18 may be selected through the corresponding plug in modules 20A, 20B, 20C and 20D. The decoder 54 also responds to the individual binary-coded decimal signals to generate different decimal signals on a 16-wire cable which is connected to a plurality of transmit frequency selection photocell switches represented by the block 56. The photocell switches perform switching functions which are introduced to the plug in modules 20A, 20B, 20C and 20D over respective five-wire cables, and which, in turn, set the selected radio unit to a selected transmit-receive frequency.

In like manner, the push button switches of the receive frequency select keyboard 10B are connected to an encoder 300 which, in turn, is connected to a latching circuit 302. The latching circuit 302 is connected to a lamp decoder 304 which is connected back to the push button switches of keyboard 10B. Whenever a push button switch in keyboard 10B is actuated, encoder 300 generates a corresponding binary-coded decimal signal which is latched in latching circuit 302. Decoder 304 responds to the latched binary-coded decimal signal to generate a corresponding decimal signal which, in turn, illuminates a lamp in the actuated push button switch of the keyboard 10B. The binary-coded decimal signals generated by the encoder 300 are also carried to the combiner 20 on a twelve wire cable and introduced to a receive decoder 55. The binary-coded decimal signals are formed into corresponding decimal signals in decoder 55 and transmitted to a plurality of receive frequency selection photocell switches in switching circuit 57 over a sixteen-wire cable. The photocell switches in block 57 perform appropriate switching functions which are translated through the plug in modules 20A, 20B, 20C and 20D in combiner 20 to the various radio units 15, 16, 17 and 18, so that a selected radio unit may be switched to a selected receive frequency.

The sixteen push button switches of the keyboard 10A of FIG. 3 serve, therefore, to activate appropriate electronic switching circuitry to select the frequency channel desired to transmit and receive a particular transmission, and to elect a particular one of the radio transmitter/receivers 15-18 for transmitting and receiving over that particular frequency channel. The electronic circuitry associated with the push button switches of the keyboard 10A is illustrated in greater detail in the circuit diagram of FIG. 4.

Figure 4:
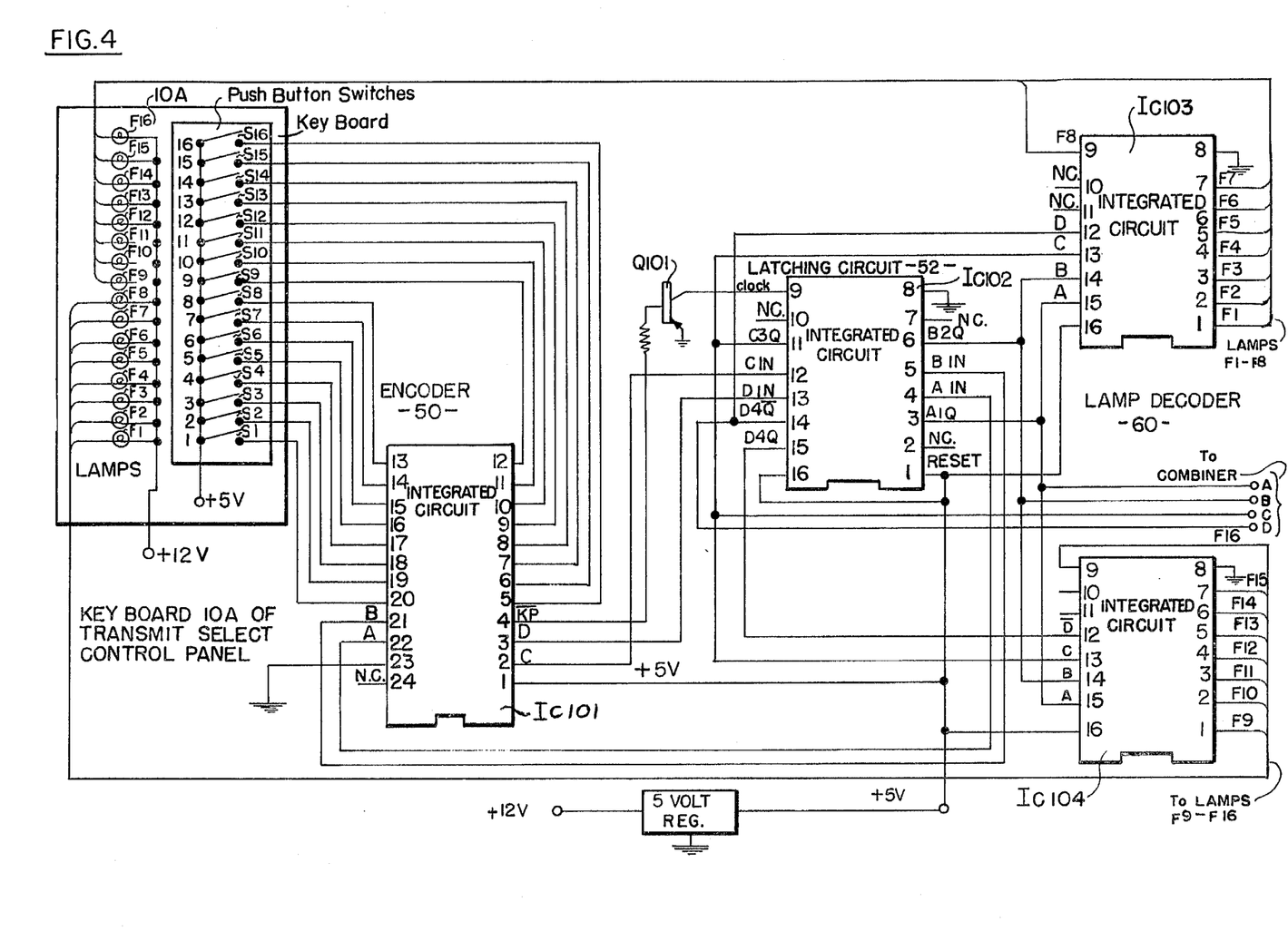
FIG. 4 is a logic diagram of a transmit-receive frequency select keyboard included in the console of FIG. 1, and associated logic circuitry.

As shown in the diagram of FIG. 4, the push button switches S1-S16 of the transmit frequency selection keyboard 10A are connected to an integrated circuit IC101 (which may be of the type designated HDO165), and which forms the decimal-to-binary-coded-decimal encoder 50. The encoder responds to the actuation of the push button switches to generate a binary-coded decimal signal identifying in each instance an actuated push button switch, and these signals are applied to an integrated circuit IC102 (which may be of the type designated 74175), and which forms the latching circuit 52. The encoder 50, therefore, converts the sixteen decimal signals corresponding to the sixteen push-button switch actuations of keyboard 10A into corresponding binary-coded decimal signals, and these signals are latched by latching circuit 52. The conversion from decimal signals to binary-coded decimal signals reduces the number of wires required in cable 22 (FIG. 3) between the console 10 and the combiner 20 from sixteen to four.

Specifically, the momentary contact of any one of the sixteen push button switches of the transmit frequency select keyboard 10A is converted to four-wire binary-coded decimal signals and inverted four-wire binary-coded decimal signals by encoder 50. The binary-coded decimal signals A, B, C and D from the encoder are applied to integrated circuit IC102 in the latching circuit 52. The integrated circuit IC102 provides binary-coded decimal latched outputs at the four output terminals A, B, C and D, which outputs are carried to the decoder 54 of combiner 20 in FIG. 3 by the four-wire cable 22. Each latched signal remains in its true state after the corresponding push button has been released and until another push button is actuated.

The lamp decoder 60 is formed of two integrated circuits IC103 and IC104 (each of which may be of the type designated 74145). The lamp decoder is a binary-coded decimal to decimal demultiplexer, and it serves to convert the latched binary-coded decimal signals back to decimal outputs, so that an energizing signal is applied to one of the push button switch-illuminating lamps F1-F16 corresponding to the actuated push button switch S1-S16 in the transmitter frequency select keyboard 10A. This signal is used to energize a lamp in the actuated push button switch, so that the actuated push button switch may be illuminated, so long as the particular frequency channel represented by that switch is selected by the system.

To reiterate, the transmitter frequency selection is accomplished by applying a momentary 5-volt signal from one of the push button switches of keyboard 10A to one of the input pins of integrated circuit IC101 forming the encoder 50. This integrated circuit converts the one-of-sixteen switch inputs into binary-coded decimal format representing the selected input. The resulting binary-coded decimal outputs from integrated circuit IC101 of encoder 50, along with an enable output KP from pin 4 of the integrated circuit (which goes low when any push button switch of keyboard 10A is actuated), are applied to integrated circuit IC102 in latching circuit 52, which causes the integrated circuit 52 to latch the particular output until another push button switch is actuated. Whenever a push button switch of keyboard 10A is actuated, the enable output KP of pin 4 of integrated circuit IC101 is inverted by transistor Q101 and applied as a clock enable pulse to pin 9 of integrated circuit IC102 in the latching circuit 52, thereby causing the four latches formed by the integrated circuit IC102 to change state in accordance with the input signals from integrated circuit IC101.

The integrated circuits IC103 and IC104 forming lamp decoder 60 accept the latched binary-coded decimal signals from the inverted outputs from integrated circuit IC102 forming latching circuit 52 and, as explained above, convert the binary-coded decimal signals back to decimal form selectively to energize the lamps F1–F16. The A, B and C inputs of integrated circuits IC103 and IC104 are paralleled, but the D input to IC104 is inverted with respect to the D input to IC103, so as to permit integrated circuit IC103 to select signals corresponding to lamps F1–F8, and to permit integrated circuit IC104 to select signals corresponding to lamps F9–F16.

As also stated, the latched binary-coded decimal signals from integrated circuit IC102 of latching circuit 52 are also sent to decoder 54 in combiner 20 over cable 22 (FIG. 3). Decoder 54 in the combiner converts the binary-coded decimal signals back to decimal form and selectively energizes the photocell switches of switching circuit 56. The photocell switches provide isolation between the logic control circuitry and the circuitry of the individual transmitter/receiver radio units 15, 16, 17 and 18, so that any frequency select reference level may be used in the individual radio units, as determined by the individual manufacturers.

A circuit similar to that of decoder 60 is implemented in decoders 54 and 55 (FIG. 3) in the combiner 20 to convert the four-line binary-coded decimal transmit frequency selection signals received over cable 22 back to the original sixteen decimal signals and to convert the twelve-wire binary-coded receive frequency selection signals back to the original sixteen decimal signals.

When a particular push button switch in the transmission frequency select keyboard 10A is actuated, a corresponding decimal output appears at one of the output terminals of decoder 54, and this decimal output energizes a corresponding one of sixteen photocell switches in the photocell switching circuit 56 to cause the selected photocell switch to perform a switching function. The switching performed by the selected photocell switch selects the transmitting frequency of the radio transmitter/receiver unit associated with the frequency selected by the actuated push button switch of keyboard 10A of console 10. Likewise, when a particular push button of receive frequency select keyboard 10B is operated, a corresponding decimal output appears at one of the input terminals of decoder 55, and this latter decimal output operates the photocell switches in switching circuit 57 to select a desired receive frequency of a selected one of radio transmitter/receiver units 15–18.

Figure 5:
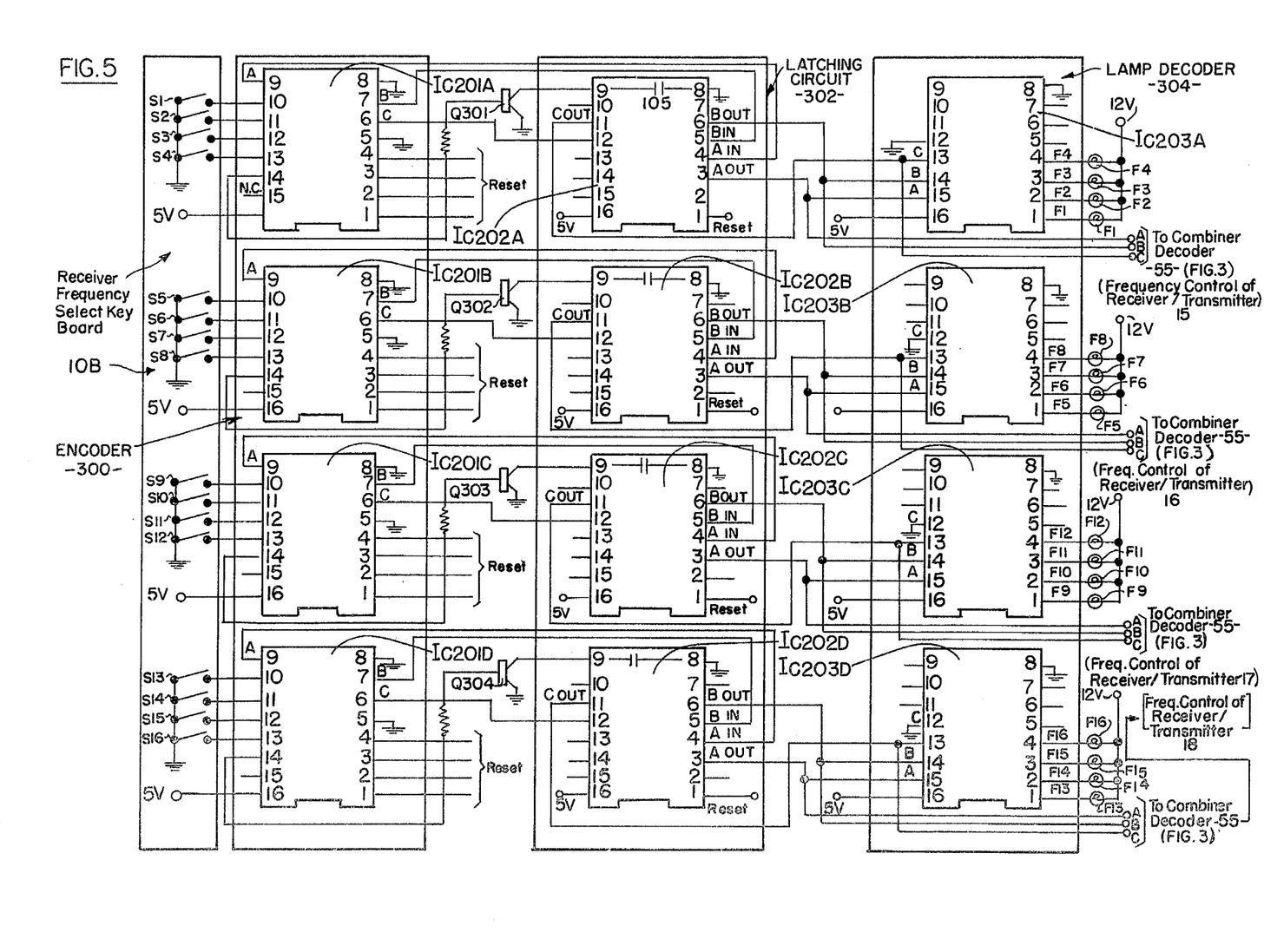
FIG. 5 is a logic diagram of a receive frequency select keyboard included in the console of FIG. 1, and associated logic circuitry.

FIG. 5 is a schematic representation of the logic circuitry associated with push button switches S1–16 of the receiver frequency select keyboard 10B. The operator may depress any one of the four push button switches S1–S4 to select a particular receiver frequency of radio transmitter/receiver unit 15. The operator may also actuate any one of the four push button switches S5–S8 to select a receiver frequency for radio transmitter/receiver unit 16; he may operate any one of the push button switches S9–S12 to set radio transmitter/receiver unit 17 to a selected receive channel; and he may operate any particular one of the push button switches S13–S16 to set radio unit 18 to a particular receive channel. The transmission received over the selected channels of the four radio transmitter/receiver units are reproduced by speaker 34 in FIG. 2.

In the schematic diagram of FIG. 5, the push button switches S1–S4 of keyboard 10B are connected to an integrated circuit designated IC201A; the push button switches S5–S8 of keyboard 10B are connected to an integrated circuit designated IC201B; the push button switches S9–S12 of keyboard 10B are connected to an integrated circuit designated IC201C; and the push button switches S13–S16 of the keyboard are connected to an integrated circuit designated IC201D. The integrated circuits may each be of the type designated 74148, and they form a decimal to binary-coded decimal encoder 300 similar to the encoder 50 of FIG. 4. The integrated circuits IC201A and IC201B of encoder 300 are connected to respective integrated circuits IC202A–IC202D in a latching circuit 302 similar to the latching circuit 52 of FIG. 4. The integrated circuits IC202A–IC202D in a latching circuit 52 may each be of the type designated 74175.

The integrated circuits IC202A–IC202D, in turn, are connected to integrated circuits IC203A–IC203D in a lamp decoder 304, similar to the lamp decoder 60 of FIG. 4. The integrated circuits IC202A–IC202D are also connected to a decoder 54 in the combiner 20 (FIG. 3) over leads designated A, B and C. Whenever a push button switch on the receiver keyboard 10B is actuated, a ground is placed on a corresponding pin of one of the integrated circuits in the encoder 300. The three-wire binary-coded decimal output from each of the integrated circuits of the encoder is applied to the respective inputs of the integrated circuits in the latching circuit 302. Also, a clock enable pulse from pin 14 of each encoder integrated circuit is applied through a corresponding one of the inverting transistors Q301–Q304 to the clock input pin 9 of the corresponding integrated circuit in the latching circuit 302, this pulse being required in order for the inputs to latch.

The latched binary-coded decimal outputs from the latching circuit 302 are fed to the integrated circuits in the lamp decoder 304 in which they are converted back to decimal form for selective energizing of the lamps F1–F16 associated with the push button switches S1–S16 of keyboard 10B. The latched binary-coded decimal signals are also delivered to the decoder 54 for the selective activation of the photocell switches in the combiner to select the desired receiver frequency channel. As before, the photocell switches are used in the combiner to isolate the logic circuitry from the circuitry of the individual transmitter/receiver units, so that proper operation can be achieved regardless of the reference level selected in any particular transmitter/receiver unit.

Figure 6:
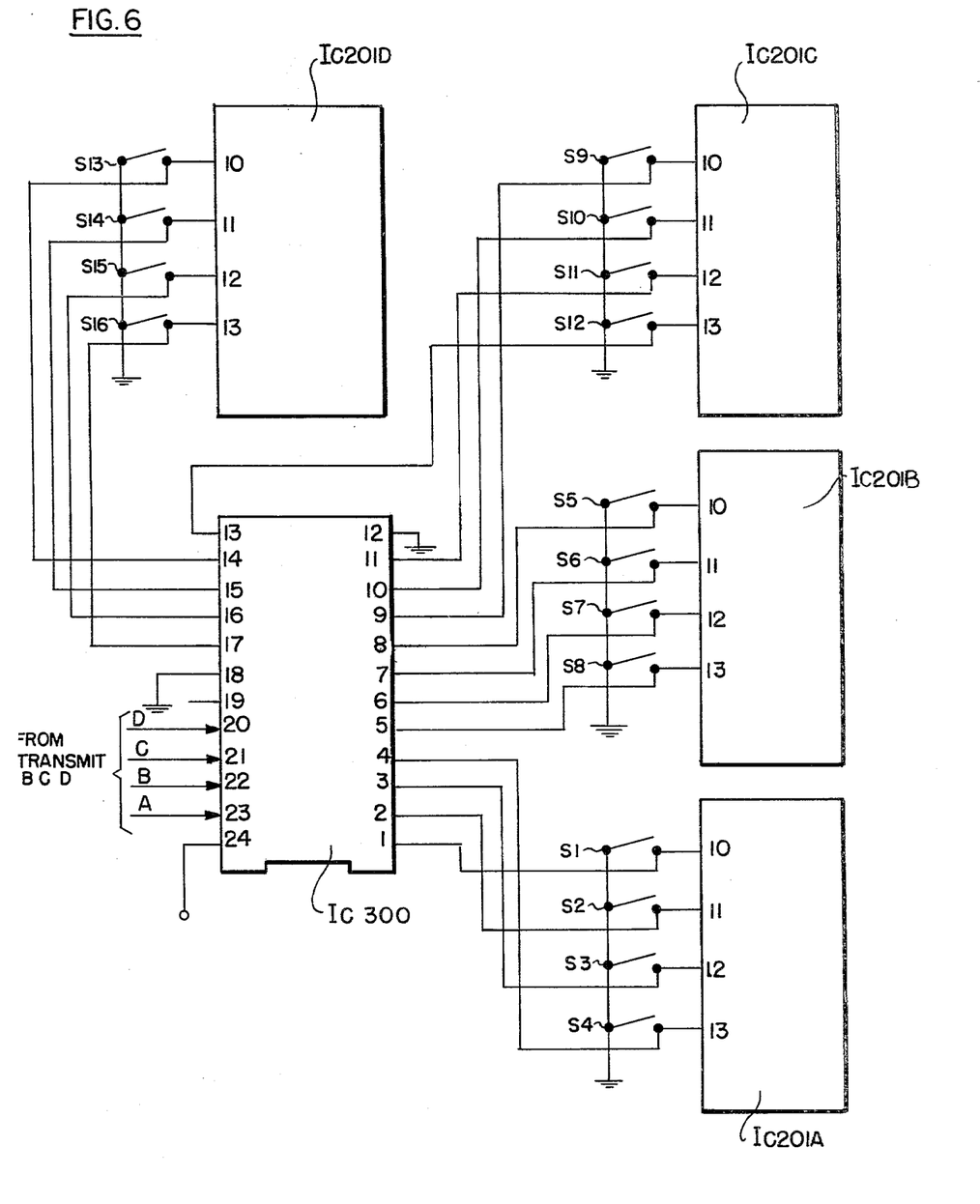
FIG. 6 is a logic diagram of an override circuit associated with the logic circuitry of FIG. 5.

Whenever a transmit frequency is selected for transmission on a certain channel by actuation of a push button on the transmit select control panel 10A (FIG. 4) the same receiver frequency must automatically be selected for monitoring. Since the receiver frequencies of each transceiver can be selected at random by the operator by actuating the push buttons of the receiver frequency select keyboard 10B (FIG. 5), overriding circuitry must be provided which will cause the transmit frequency select keyboard 10A to have priority control over the received select keyboard 10B, so that whenever a transmit frequency is selected by the keyboard 10A, the same received frequency will also be selected. This is accomplished by the circuitry shown in FIG. 6, in which an integrated circuit IC300 is provided which may be of the type designated 74154, and which responds to the binary-coded decimal signals from the circuitry of FIG. 4 to generate corresponding decimal signals. The sixteen decimal outputs from the integrated circuit IC300 are connected to the corresponding integrated circuits IC201A-IC201D of the encoder 300 of FIG. 5, and these signals simulate the closing of a corresponding one of the push button switches of the receive keyboard 10B. Therefore, whenever a push button switch of the transmit frequency select keyboard 10A of FIG. 4 is actuated, the resulting binary-coded decimal output from the circuit of FIG. 4 causes the integrated circuit IC300 of FIG. 6 to produce a corresponding decimal output which simulates the pressing and latching of the corresponding push button on the receiver keyboard 10B.

As described in conjunction with FIG. 2, the system of the invention may include a single speaker 34, which is used to reproduce all signals received by the transmitter/receiver units. The quality of reception is not affected, and a volume control can be used to lower or eliminate the particular transmitter/receivers which are not desired to be heard in preference to that which is desired to be heard. This control is effectuated by the four volume controls 80, 82, 84 and 86 of section 10D of the console of FIG. 1.

The primary function of the combiner 20 (FIG. 1) is to integrate the functions of the several mobile radio transmitter/receivers 15, 16, 17 and 18 (FIGS. 1 and 2), so that the operation and control of all the radio units may be effectuated by the console 10. Each mobile radio unit is interfaced to the combiner by the use of the plug in modules 20A, 20B, 20C and 20D (FIG. 1). These modules match the circuitry of each radio unit with the basically standardized circuitry of the combiner 20. Therefore, regardless of which brand or model of mobile radio unit is used, it can be interfaced with the combiner by the use of an appropriate plug in module, so that all units can be operated and monitored by the console 10, regardless of make or model. This feature of the combiner 20 overcomes the lack of standardization which exists in the mobile radio communications industry, and permits any make of mobile radio transmitter/receiver unit to be readily installed into the system.

The combiner 20 illustrated in FIG. 1 will accept for interfacing up to four-frequency radio units, or any combination of such units, which will total a maximum of sixteen frequency channels. Each module is designed to be used in conjunction with a particular brand and model of mobile radio transmitter/receiver unit to permit that model to be installed and interfaced into the combiner.

The combiner 20 may be supplied power directly from the electrical system of the vehicle, and this power is distributed to each radio transmitter/receiver unit 15, 16, 17 and 18 through the power distribution panel 20F (FIG. 1) of the combiner, and through each plug in module 20A, 20B, 20C and 20D associated with the radio units. The power to the individual radio units is controlled by local "on-off" switches 110, 112, 114, 116 which are mounted on the power distribution panel 20F. Appropriate indicator lamps are also mounted on the power distribution panel.

Figure 7:
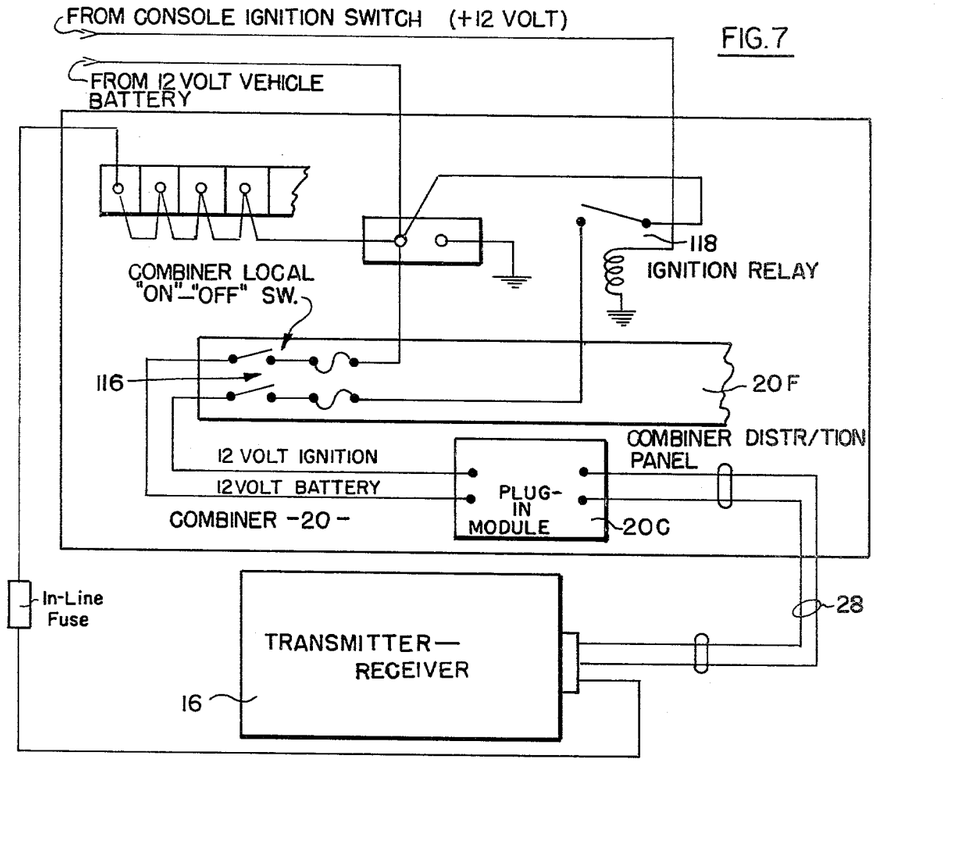
FIG. 7 is a schematic diagram, partly in circuit form and partly in block form of a power distribution circuit for the transmitter/receiver radio communication units of FIG. 1.

Energizing power to all the radio units 15-18 is obtained through a special relay 118 (FIG. 7) which is controlled by a console ignition switch. Power for relay 118 is obtained from the voltage available in the combiner 20, this power being supplied to relay contact, as shown in FIG. 7. When the ignition switch is turned "ON", a positive voltage (+12) is provided to the ignition relay 118 to energize the relay. The relay contacts then close, and the energizing power is then distributed to each individual radio unit 15-18 of FIG. 1 through its plug in module 20A-20D, and through its local OFF-ON switch 110, 112, 114 and 116 on the power distribution panel 20F of combiner 20. The circuit to mobile radio 16 through its plug in module 20C, as controlled by its ON-OFF switch 116, is illustrated in FIG. 7. It will be understood that similar circuitry is provided for the other mobile radios through their individual plug in modules.

The combiner 20 also includes the transmitting frequency selection and receiving frequency photo cell switching circuits 56 and 57 referred to in the description of FIG. 3. The purpose of these circuits is to overcome the lack of standardization within the mobile radio industry regarding the various methods used to select the transmit and receive frequencies of the mobile radios. The photo cell switching circuits are necessary to transpose the method used by the individual manufacturer for selecting transmit and receive frequencies into a standard type of circuit which will select transmit and receive frequencies regardless of which make or model of mobile radio is connected to the combiner.

When one of the sixteen frequencies is selected at the transmit frequency select keyboard 10A in the console of FIG. 1, for example, the output from the decoder circuit 54 (FIG. 3) in the combiner 20 removes a +5-volt DC voltage from one of sixteen wires which are connected to the switching circuit 56. The resulting zero reference voltage is used to switch a corresponding non-contact photo cell switching element in circuit 56 which connects the proper reference to the radio corresponding thereto to cause the frequency of the radio to be switched to the channel desired for transmitting and receiving. A plurality of tungsten lamp photo cell lamp modules are used to perform the non-contact type of switching referred to above. The circuitry of one such module is shown in FIG. 8.

Figure 8:
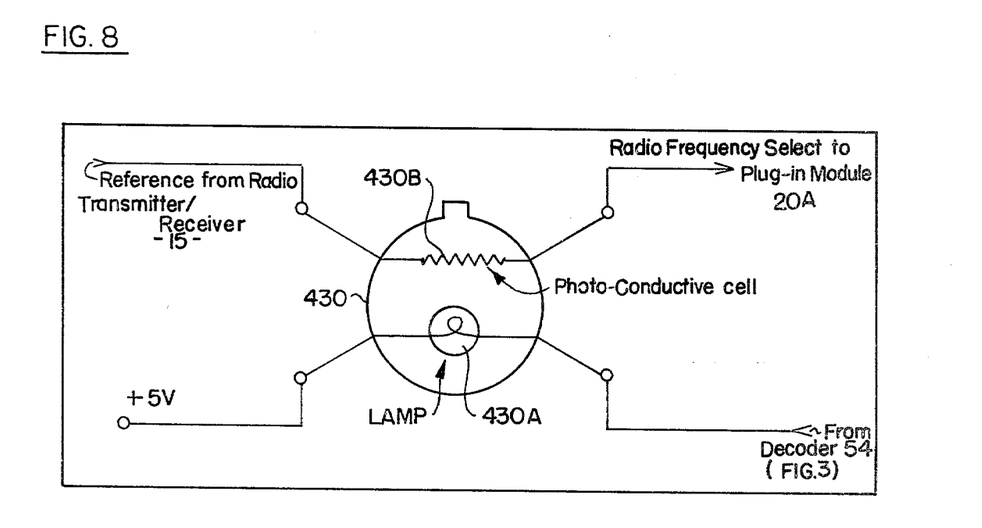
FIG. 8 is a circuit diagram of a photoelectric switching element, a multiplicity of which are used in the system of the invention to switch the various radio transmitter/receiver units of FIG. 1 to selected frequency channels.

The circuitry of FIG. 8 includes a photo unit 430 which, in turn, includes a lamp 430A and a photo-conductive cell 430B. The manufacturer's reference from the corresponding radio unit 15 is connected through photo cell 430B to the frequency selection plug in module 26A of the radio unit 15. Therefore, when the photoconductive cell 430B is rendered conductive, the proper reference is applied to the radio 15 so that it is set to the desired frequency channel. The lamp 430A is preferable a tungsten lamp, and it normally is extinguished by applying 5-volts to both its input terminals. However, when the decoder circuit 54 responds to the actuation of a particular push button on the transmit frequency select keyboard 10A of the console in FIG. 3, the 5 volts on the right hand terminal of the lamp drops to zero, and the lamp is illuminated. This causes the resistance of the photo cell to drop to a low value, so that the reference is applied to the corresponding radio unit 15, to tune the radio unit to the desired frequency channel. It will be appreciated that a separate module, such as the module shown in FIG. 8 is provided for each of the sixteen decoded outputs from the decoder circuit 54, and for each of the sixteen outputs of decoder 55 (FIG. 3), in the combiner 20.

As described above, the binary coding system in the console 10 which encodes the transmit frequency select switching of the sixteen momentary switches on keyboard 10A also automatically selects the radio unit 15-18 to be keyed for transmission. For example, when any one of the push buttons of the top row of keyboard 10A in FIG. 3 is actuated, radio unit 15 is selected; when any one of the push buttons of the second row is actuated, radio unit 17 is selected; when any of the push buttons of the third row is actuated, radio 16 is selected, and when any one of the push buttons of the bottom row is actuated, radio unit 18 is selected.

Figure 9:
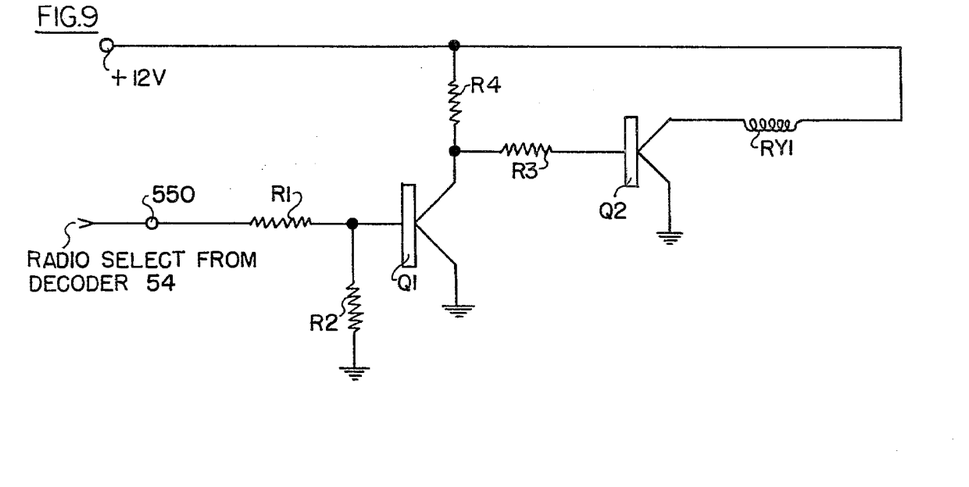
FIG. 9 is a circuit diagram of a circuit used to select any one of the transmitter/receiver radio units of FIG. 1 in response to appropriate actuation of the keyboards of FIGS. 4 and 5.

Radio unit selection is achieved by introducing outputs from the decoder 56 of FIG. 3 to appropriate radio selection circuitry in the various plug in modules 20A, 20B, 20C and 20D, such as shown in the circuitry of FIG. 9. The circuitry of FIG. 9 is incorporated into each of the plug in modules 20A-20C. The circuit includes an input terminal 150 which is connected through a 10 kilo-ohm resistor R1 to the base of a transistor Q1. The base is connected to a grounded 22 kilo-ohm resistor R2, and the emitter of the transistor is grounded. The collector of the transistor is connected through a 2.2 kilo-ohm resistor R3 to the base of a second transistor Q2, and through a 2.2 kilo-ohm resistor R4 to the positive terminal of a 12 volt source. Transistors Q1 and Q2 may be of the type designated GE18. The emitter of transistor Q2 is grounded, and the collector is connected to the 12 volt source through a relay winding designated RY.

When the transmit frequency keyboard 10A push buttons are activated so that decoder 54 of FIG. 3 produces a low output at its output terminal A, for example, an input is applied to terminal 550 of the select circuitry of FIG. 9 in plug in module 20A to energize relay RY1. Likewise, when the keyboard 10A is operated to cause a low output to appear at its output terminal B, a similar select circuit in that module causes a similar relay to be energized. Likewise, low outputs at output terminals C and D of the decoder 54 cause similar relays to be energized in select circuits in plug in modules 20C and 20D.

Figure 10:
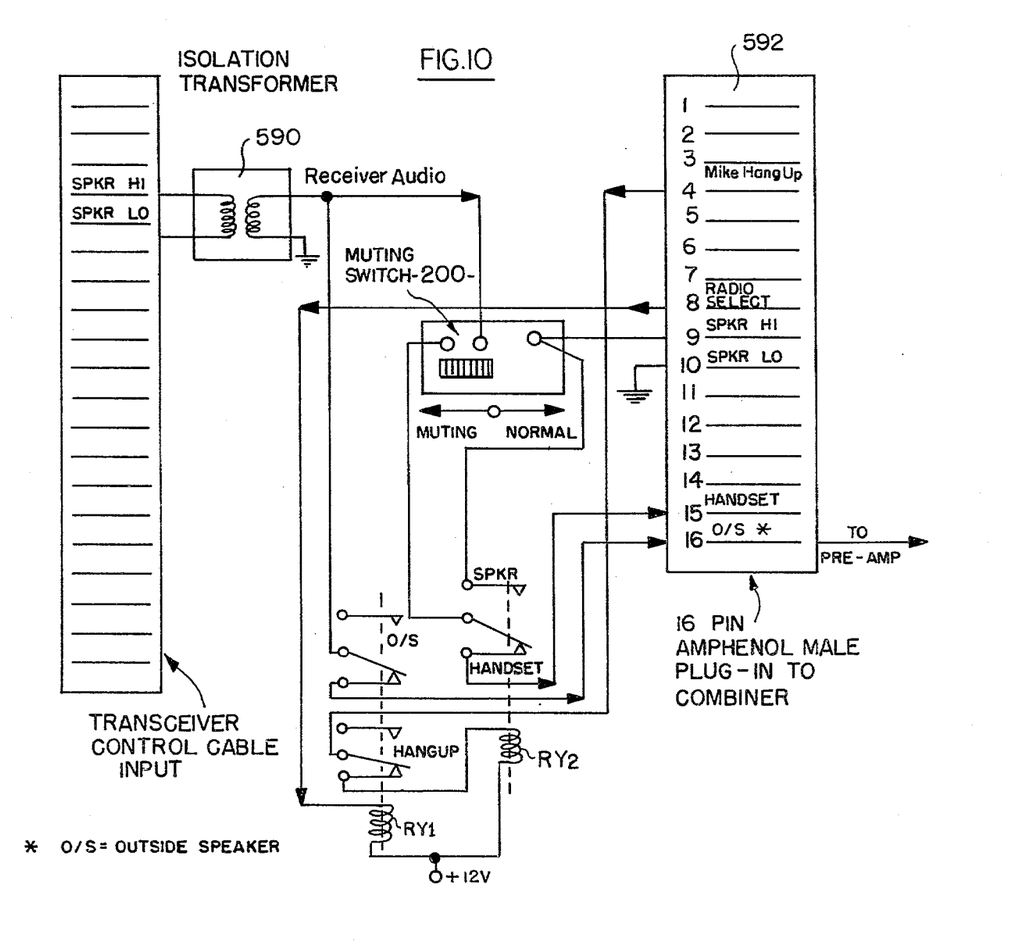
FIG. 10 is a circuit diagram of receiver audio paths through and a corresponding plug-in module in the combiner of FIG. 1.

The audio "low" reference level varies in the outputs from different makes of mobile radio receivers which connect to the common speaker 34 (FIG. 2) of the system. Therefore, audio isolation transformers, such as the transformer 590 of FIG. 10, are used in the plug in modules 20A, 20B, 20C and 20D (FIG. 1) to provide a common "low audio" reference level to the circuitry of combiner 20 which transposes the receiver audio output of the four radio units 15-18 to be controlled by the volume controls 80, 82, 86, 88 on the console of FIG. 1. This and related circuitry overcomes the lack of standardization within the industry regarding receiver audio output circuits and permits the interfacing of any make or model of radio unit into the system of the invention.

Each radio transmitter/receiver control cable which delivers received audio to its plug in module (20A-20D) is connected to an isolation transformer 590. One end of the secondary winding of transformer 590 is connected to chassis ground to serve as the audio low reference level of the control system. The receiver audio high of the secondary winding is connected to a muting switch 200 and also to the contacts of relay RY1. The primary and secondary impedance of the transformer are each eight ohms.

The contacts of RY1 are normally open until the relay is energized by the radio select function, which is an automatic selection provided by the decoder 54 of the transmit frequency select system as described in conjunction with FIG. 9. When the contacts of relay RY1 are closed, the receiver audio is routed directly in the preamplifier of the outside speaker by way of pin 16 of a male amphenol connector 592 which plugs the particular module into the combiner 20. Pins 16 of all the modules (20A-20D) are connected in parallel, and only one wire connects the function to the preamplifier. Since only one of the plug in modules can have its relay RY1 energized at any one time, it will be the receiver audio of the radio transmitter/receiver associated with the module selected that will be available to the preamplifier at any particular time.

Within each plug in module (20A-20D) located in the combiner 20, the receiver audio of each radio transmitter/receiver unit is routed through a muting switch 200 (FIG. 10). When the muting switch 200 in the "OFF" position, the receiver audio is routed directly to the respective volume control located on the console panel. When the muting switch is in the "ON" position, the receiver audio is connected to a set of contacts of relay RY2. When not energized, the RY2 contacts also connect receiver audio to the console volume control, exiting the plug in module through pin 9 of the plug 592 which plugs into the combiner. When relay RY2 is energized, the receiver audio is connected through the contacts and through pin 15 of the module plug to the combiner 20, and to the ear piece of a handset, when used with the console in lieu of microphone 14 (FIG. 1).

The handset audio circuits of all modules are connected in parallel within the combiner 20, with only one wire connecting the receiver audio from the combiner to the microphone jack located within the console 10. The grounding circuit which energized relay RY2 is effective only when the handset is lifted from the handset hangup switch at the console. However, the grounding circuit is routed through a set of contacts of relay RY1 of each plug in module. Since only one plug in module within the combiner 20, and thus only one of several RY1 relays, can be selected for activation by the radio select decoder 54 (FIG. 3) at any one time, only one of several RY2 relays can be energized at any one time when the handset is lifted from the cradle containing a hangup switch. It is this one radio transmitter/receiver unit receiver audio which will be heard in the ear piece of the handset. When in the hangup position, the receiver audio will be heard in the speaker, since the RY2 relay will be deenergized and the contacts open.

Figure 11:
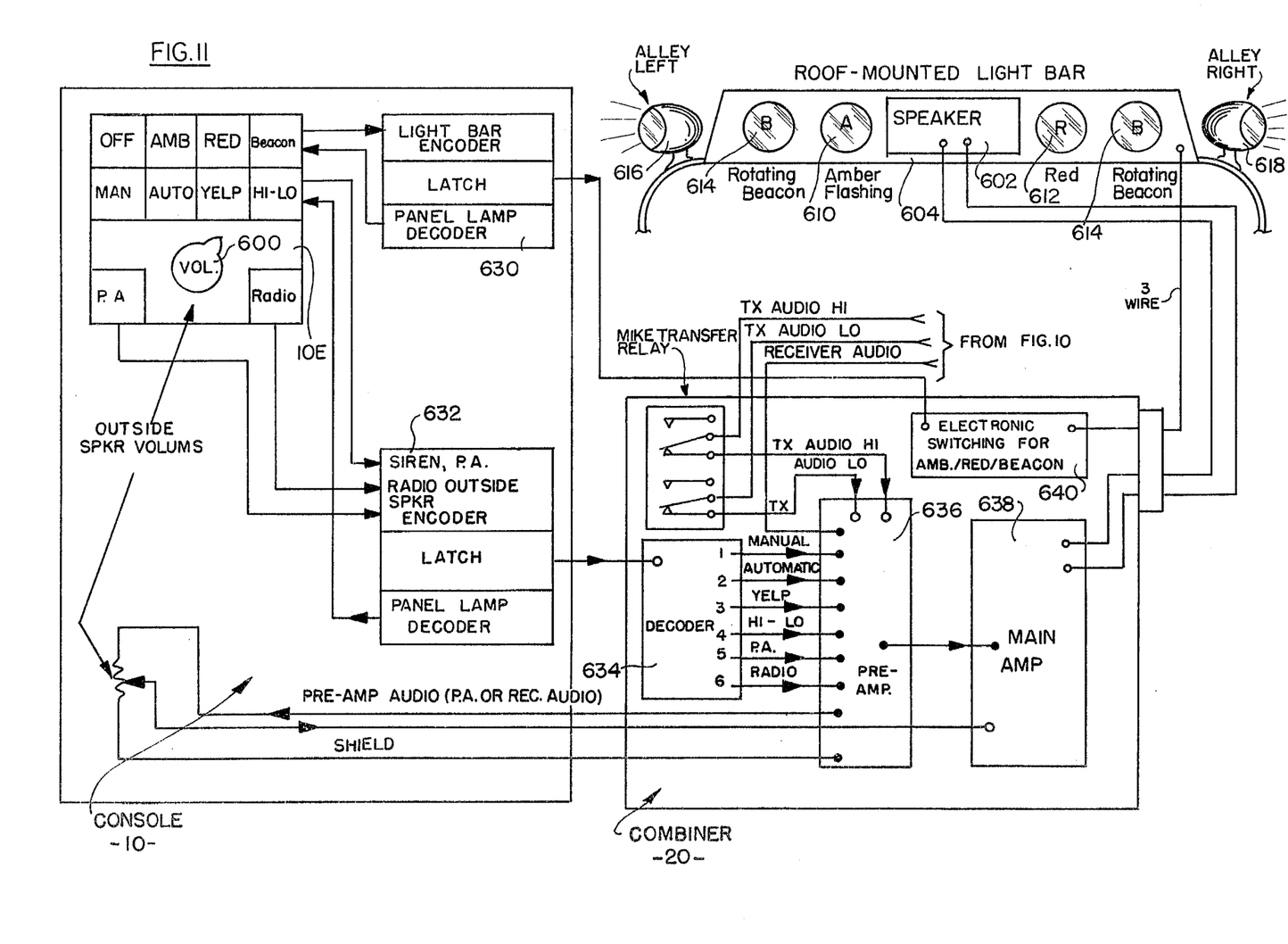
FIG. 11 is a generalized schematic diagram of an addition to the system of FIG. 1 to adapt the system for use in emergency vehicles.

Console 10 of FIG. 1 may include an additional keyboard 10E (FIG. 11). The keyboard 10D is provided for the operation and control of emergency vehicle type of equipment and systems, and this keyboard controls two separate encoding systems that are both mounted on one circuit board within the console 10. One system is provided for control of the electrical lighting units mounted within the roof-mounted light bar 604 of the emergency vehicle. The push button select switches for this system are those located on the top row of the keyboard, and are designated "OFF", "AMB", "RED" and "BEACON". These switches control the amber flashing lights 610, the red flashing light 612, and the rotating beacon lights 614, of light bar 604. The light bar also includes left and right alley lights 616 and 618 which are controlled by the switches of section 10C of console 10 of FIG. 1.

A second system controls the operation of an electronic siren, a public address unit and radio receiver outside speaker system, the circuitry of which is located within the combiner 20. The push button switches provided for the selection of the electronic siren functions are the four switches located in the second row of the keyboard, and designated "man", "auto", "yelp" and "high-low". The public address select switch "P.A." is located in the lower left hand corner of the keyboard 10E, and the radio select switch "radio" is located in the lower right hand corner of the keyboard. A volume control 600 is provided to vary the level of audio to the outside speaker 602 from the public address system, and the radio receiver outside speaker system is located in the center of the keyboard.

With very slight modifications to each of the two systems, they are identical to the receiver frequency select encode-latch-lamp decoder components and circuitry used with the radio transmitter/receiver control system described above. Therefore, the sequence of selection and latch and lamp decoder circuitry will not be explained in detail. Only the slight differences of the system will be referred to regarding the light bar and siren systems.

It should be noted that in all of these systems the encoder is capable of encoding up to eight input switching selections, even though all eight are not always utilized. Four of the eight switching selections are used in the receiver frequency select system for each four frequency radio transmitter/receiver 15-17 (FIG. 3), and the functions of two of the encoder are interconnected for use with an eight frequency radio transmitter/receiver. This permits the use of the remaining four inputs as reset functions, when so desired. Four of the inputs of the encoder are used for the light bar system of FIG. 11. Six of the available eight input selections are used within the electronic siren, public address and radio systems. It should also be noted that in each system all switches are interlocked electronically, allowing only one selection, one function, and one lamp to be activated at any one time. Each selection made in the top row of the keyboard 10E renders the prior selection inoperative. Each selection made with the six remaining push button switches on the keyboard 10E also renders the prior selection inoperative.

Regarding the light bar system, the "OFF" switch of keyboard 10E is used only as a reset function and a green colored lamp is activated to advise the driver that the system is on, but no lights on the light bar are energized. The "AMB" switch energizes the amber light 610 mounted within the light bar 604; the "red" switch controls the red light 612, and the "beacon" switch activates electronic switching circuitry which will turn on a motor inside the light bar 604 and energize the rotating beacons 614 which are rotated by the motor.

The modification made to the light bar encoding system is that the output of the system used to activate circuitry located within the combiner 20 is taken directly from the lamp decoder located within the console, rather than utilizing the BCD lines. Therefore, a decoder is not required for this sytem, as is required to be located within the combiner for similar systems. Instead, the output is obtained by paralleling three wires, respectively, to the lamp circuit decoder outputs which correspond to the selections made for the amber, red, and beacon lights desired to be energized. Each output is fed directly to the input of the transistor circuitry of one lamp and that of another. For example, a diode connected between the input of the driver transistor for the red light and that of the amber light will cause both lights to be switched on when switch "red" of the top row of keyboard 604 is selected, but selection of the amber light will turn on the amber light only. Another diode connected between the input of the driver transistor of the beacon lights 614 and that of the red light 612, in addition to the first diode, will cause all lights to be energized when the "beacon" switch of the top row of keyboard 10E is selected. Therefore, for a code 3 situation, the driver need only operate the "beacon" switch for all lights of the light bar to be energized. Above each switch in the top row, a light emitting diode may be mounted to serve as a backup light indicator should the lamp within the corresponding push button switch fails to energize.

The second system controlled by the same keyboard 10E, namely the siren, public address, and radio receiver system, is identical to the receiver frequency select system, except that six of the available eight input selections of the encoder are utilized. The four push button switches are used to preprogram the optional siren modes of the electronic siren oscillator circuitry located in the combiner. The "P.A." switch is used to select the public address function, and the "radio" switch is used to activate the radio receiver outside speaker system.

The electronic siren, the public address and the radio select functions each share the same main amplifier, the output of which is connected to the power speaker 602 located within the roof-mounted light bar 604, and only one function can be used at any one time. Therefore, it is fitting that the six switches be interlocked.

The electronic siren is never activated unless all lights within the light bar are energized. Therefore, although one of the four siren modes is preprogrammed, thus, always armed for immediate use, it is the "beacon" push button switch of keyboard 10A which automatically turns on a siren oscillator, according to the mode which is preprogrammed, at the same time that all lights within the light bar 604 are energized. However, if the preprogrammed selection is the manual mode, the siren can only be activated by the horn ring of the vehicle, when pressed by the driver-operator. The driver-operator can change the mode of the siren at any time to "automatic", "yelp", or "high-low" by operating the prespective switches of the keyboard 10E but it will only operate if the "beacon" switch of the top row is selected.

All selections of the siren system are encoded, latched, and decoded for activation of transistor circuitry that energized relays within the combiner, the contacts connecting various tie-points within the preamplifier 636 and the main amplifier 638 that determine the function to be provided for delivery to the outside speaker 602 located within the light bar 604.

Selection of the public address amplifier function activates a microphone audio and push-to-talk circuit to the required input circuitry of the preamplifier 636 and amplifier 638 located within the combiner 20, in order for the driver-operator to use the public address system. The encoding and decoding circuitry also activates transistor switching circuitry to rearrange the preamplifier tiepoints for use with the microphone input audio and push-to-talk circuit, as opposed to use of the siren or radio receiver input configuration of the preamplifier.

The radio receiver outside speaker select switch "radio" rearranges the configuration of electronic circuitry of the preamplifier 636 and changes the input of the main amplifier 638 to accept receiver audio from the radio transmitter/receiver which has been determined by the transmit frequency select keyboard (also selects correct transmitter/receiver according to frequency selected), for amplification and delivery to the power speaker 602 located within the light bar 604.

A three wire BCD line is used to interconnect the encoder circuitry located within the console to the decoder circuitry, located within the combiner for operation and control of this system.

As shown in FIG. 11, the keyboard 10E; and its light encoder, latch and lamp decoder circuits 630; and its siren, public address and speaker encode, latch and lamp decoder circuits 632, are located in the console 10. the decoder 634, preamplifier 636, main amplifier 638, and electronic switching circuitry 640, are all located in combiner 20.

The invention provides, therefore, a mobile radio control system by which several radio transmitter/receiver units located in the trunk area of a vehicle are controlled by a keyboard on a console located in the dash area of the vehicle, the system requiring but a single microphone and a single speaker in the operation of all the radio units. The user of integrated circuits, tungsten lamp photo cell modules, and the application of recently developed computer techniques to the design of the system results in an efficient, compact and relatively inexpensive system which is ideally suited to achieve the purpose of the invention.

The push button operation and control of the several radio transmitter/receiver units and other types of electronic systems from the single console located within the dash area of the vehicle, and the ability of the combiner unit in the trunk area of the vehicle to integrate into the system a plurality of dissimilar radio transmitter/receiver units of different makes and models, is an important factor in the creation of a commercially feasible system.

The console in the dash area is relatively small in size and light in weight. It is easily installed, and it is readily removable for repair or replacement purposes. Moreover the use of integrated circuit components makes the console functionally reliable, with easy access for servicing purposes. In addition, the use of integrated circuit components and push button illuminated switches to activate the components results in many advantages as to size and weight because the components themselves are small in size and light in weight. Moreover, the system exhibits minimal power requirements.

The concentration of all controls and switches, grouped according to function, on one console control panel, which can be located at dashboard height and angled toward the driver-operator, results in a distinct and convenient position which improves the efficiency of operation of the several systems as opposed to present-day techniques which result in several units being mounted very low and close to the floor of the vehicle, with none of the units being angled for easy selection and operation by the driver-operator.

The integrated circuit components and circuitry which serve as the decoder of the electronic switching performed by the console portion of the system are located within the combiner. unit in the trunk of the vehicle, and easy access for servicing is contributed to the system by this type of technology, which results in a relatively compact, efficient and reliable part of the system.

As described above, the selection of a frequency by the driver-operator in the dash area is encoded in the console circuitry, decoded in the combiner, and fed directly to the photo cell lamp module which converts the reference level used by a particular manufacturer to select the frequency in the selected radio-transmitter/receiver unit. Activating of the switching function of the photocell lamp module is initiated by the circuitry in the console portion of the system. However, the standard circuitry in the combiner which does the activating is isolated from the radio unit to which the actual switching section of the photo cell lamp module is connected. The photo cell lamp modules overcome the lack of standardization in the method used for frequency selection in the various types and sizes of the radio transmitter/receiver units. In such units, some manufacturers use chassis ground or a shield for the frequency selection reference, others use a negative voltage, others a positive voltage, and so on. Regardless of the method used by the various manufacturers, the combiner adapts each type of radio unit to the control exerted by the system of the invention.

The reduction of sixteen transmit frequency selections to four wires in the cable interconnecting the console with the combiner, and the reduction of sixteen receive frequency selections to twelve wires is another example as to how and why the system of the invention saves space and expense. Also, the use of only one microphone circuit between the console and the combiner, as compared with the individual circuits required for each system in the prior art, represents a material saving in expense and complexity.

The adoption of the system of the present invention into mobile radio vehicles results in a new era in the field of mobile radio in which the deteriorating situation regarding the installation and use of several systems within the vehicle is corrected.

While particular embodiments of the invention have been shown and described, modifications may be made. It is intended in the claims to cover the modifications which come within the spirit and scope of the invention.

I claim:

1. A mobile radio control system for use in a vehicle having a dash area and a rear area, said system comprising:
    a console in said dash area including a first keyboard having a plurality of manually-operated transmitter frequency selection switches and a second keyboard having a plurality of receiver frequency selection manually-operated switches;
    transmitter frequency-selecting switching circuitry connected to said switches of said first keyboard;;
    receiver frequency-selecting switching circuitry connected to the switches of the second keyboard;
    at least one radio transmitter/receiver unit in said rear area;
    a combiner unit including circuitry interfacing said radio transmitter/receiver unit with said switching circuitries; and
    cable means connecting said transmitter frequency-selecting switching circuitry to said combiner unit to cause the actuation of said switches of said first keyboard to select the transmitter frequency of said radio unit and connecting said receiver frequency-selecting switching circuitry to said combiner unit to cause the actuation of the switches of the second keyboard to select the receiver frequency of the radio transmitter/receiver unit.

2. The mobile radio control system defined in claim 1, and which includes supervisory overriding circuit means connecting the switches of said first-named keyboard to said receiver frequency-selecting switching circuitry.

3. The mobile radio control system defined in claim 1, includes a light bar assembly mounted on the roof of the vehicle, and circuitry connecting at least one of said keyboards to said light bar assembly to enable predetermined light bar functions to be controlled thereby.

4. A mobile radio control system for use in a vehicle having a dash area and a rear area, said system comprising:
 a console in said dash area including a keyboard, said keyboard having a plurality of manually-operated transmitter frequency selection switches;
 transmitter frequency-selecting switching circuitry connected to said switches;
 at least one radio transmitter/receiver unit in said rear area;
 a combiner unit including circuitry interfacing said radio transmitter/receiver unit with said switching circuitry;
 cable means connecting said switching circuitry to said combiner unit to cause the actuation of said switches of said keyboard to select the transmitter frequency of said radio transmitter/receiver unit, said switching circuitry including converting means for converting decimal switching signals from said switches into binary-coded signals for transmission over said cable means, and said switching circuitry further including latching circuitry coupled to said converting means for latching said binary-coded signals in response to the momentary actuation of said switches;
 decoding circuitry included in said combiner unit for converting the binary-coded signals received over the cable means to decimal signals; and
 switching circuitry coupled to said last-named decoding circuitry and responsive to said last-named decimal signals for selecting transmitter frequencies in said radio unit.

5. The mobile radio control system defined in claim 4, in which said last-named switching circuitry includes a photocell-lamp module for each of said last-named decimal signals.

6. The mobile radio control system defined in claim 4, and which includes a plurality of radio transmitter/receiver units coupled to said combiner unit, and said combiner unit including a corresponding plurality of modules containing interface circuitry for each of said radio units; and
 further switching circuitry coupled to said last-named decoding circuitry and responsive to said last-named decimal signals for selecting and activating different ones of said radio units.

7. The mobile radio control system defined in claim 6, and which includes a microphone, and circuit means connecting said microphone to the transmitter portion of said radio units.

8. The mobile radio control system defined in claim 6, and which includes a speaker, and circuit means connecting the receiver portion of said radio units to said speaker.

* * * * *